United States Patent [19]

Kanehara et al.

[11] Patent Number: 5,342,251
[45] Date of Patent: Aug. 30, 1994

[54] METALLIC BLOCK FOR DETECTING FORCE OPERATING ON METALLIC V-BELT AND SYSTEM FOR DETECTION OF OPERATING FORCE USING THE SAME

[75] Inventors: Shigeru Kanehara, Shibuya; Masashi Nakaoka, Asaki, both of Japan

[73] Assignee: Honda Giken Kogyo Kabushiki Kaisha, Tokyo, Japan

[21] Appl. No.: 69,090

[22] Filed: May 28, 1993

[30]   Foreign Application Priority Data

Jun. 16, 1992 [JP]  Japan .................................. 4-181692

[51] Int. Cl.⁵ .............................................. F16E 1/22
[52] U.S. Cl. ................................................ 474/242
[58] Field of Search ............... 474/237, 240, 242, 244, 474/201, 265

[56]        References Cited

U.S. PATENT DOCUMENTS 5,169,369 12/1992 Masuda et al. ..................... 474/242
5,263,904 11/1993 Van Hempd ....................... 474/242

FOREIGN PATENT DOCUMENTS 55-6783  2/1980 Japan .
61-54976 11/1986 Japan .
372139   7/1991 Japan .

OTHER PUBLICATIONS

English language Abstract of 60-91042 Japan, May 1985.

*Primary Examiner*—Thuy M. Bui
*Attorney, Agent, or Firm*—Lyon & Lyon

[57]            ABSTRACT

Disclosed is a metallic block for the detection of a force operating on a metallic V-belt. The metallic V-belt includes endless belt-like supporting straps and a multiplicity of metallic blocks supported along the straps. The V-belt passes around a driving pulley and a driven pulley. At least one of the multiplicity of metallic blocks comprises a notch formed in a part thereof, and a strain gauge attached to the notch. The strain gauge is intended to detect an external force applied to the metallic block. The force operating on the metallic V-belt is detected based on thus detected external force.

9 Claims, 5 Drawing Sheets

METALLIC BLOCK FOR DETECTING FORCE OPERATING ON METALLIC V-BELT AND SYSTEM FOR DETECTION OF OPERATING FORCE USING THE SAME

BACKGROUND OF THE INVENTION

1. Field of the Invention

The present invention relates to a system or the like for the detection of a force operating on a metallic V-belt which is used to transmit a power in, for example, a V-belt type stepless transmission.

2. Description of the Related Arts

Such type of metallic V-belt is hitherto known, and disclosed in, for example, Japanese Patent Publication Nos. 55-6783 and 61-54976, and Japanese Utility Model laid-open Publication No. 3-72139. This metallic V-belt comprises endless belt-like supporting straps and a multiplicity of metallic blocks supported along the straps, and passes around a driving pulley and a driven pulley.

Both the pulleys are capable of controllably varying their V-groove widths to vary winding radii of the V-belt with respect to the pulleys, thereby steplessly changing transmission gear ratio.

In the process of design and manufacture of the stepless transmission having such metallic V-belt, it is required to reduce the size and weight of the metallic V-belt while ensuring a sufficient strength thereof and to control axial thrust in an optimum manner. This would lead to the necessity for more accurate detection of a force operating on the metallic V-belt during the drive. Under these circumstances, a variety of attempts have been made hitherto for the detection of this operating force.

One of such attempts is to detect a force operating on the belt by using a strain gauge directly attached to a metallic block or the like without imparting any machining to the metallic block, the strain gauge being connected to the outside by way of wires for the retrieval of signals. More specifically, "Axial Thrust Operating on New CVT Belt and its Distribution" by Tsunashima and others in Spring Academic Lecture Meeting at Corporation Aggregate Automobile Technical Society (May 24, 1988), for example, discloses a measurement of a force in the direction of axial thrust.

In this case, however, the metallic block is used as it stands without imparting any machining thereto for the thrust measurement, which may result in an insufficient accuracy of resultant values. Moreover, the arrangement in which the detection values of the strain gauge attached to the metallic block are led to the exterior device by way of wires may place a restriction on the rotational speed and accumulative number of rotation, which may adversely lead to a measurement permissible only under extremely low-speed driving conditions.

While on the contrary, an attempt to machine the pulleys for the detection of an operating force is disclosed in an article "Study on Transmitting Characteristics of Block Type CVT belt" published by Kusana or others in Autumn Academic Lecture Meeting at Corporation Aggregate Automobile Technical Society (October, 1991), which involves a problem that the measurable transmission gear ratios are limited to a specific range due to its mechanical construction.

Another attempt to lead the measurement signals produced by the strain gauge attached to the endless belt strap to the outside has been made in, for example, "Behavior Analysis on CVT Belt" (Academic Lecture Meeting Preprint 891, 1989-5) announced by Katsuya or others (Nihon Hatsujyo) in Spring Academic Lecture Meeting at Automobile Technical Society (1989), which entails a problem that the driving conditions are limited to the extremely low speed due to a difficulty in signal transmission from the strain gauge to the outside.

A further attempt is to lead the measurement signals produced by the strain gauge attached to the endless belt strap to the outside by making use of a slip ring for the detection of pulling force of the strap, which is disclosed in, for example, "Load Stress Measurement on CVT Steel Ring" published by Okawa and others (Toyota Jidosya) in Lecture Meeting Articles Vol.C at 69th Ordinary Session in Japanese Machinery Society. This involves a problem that there exists a restriction on the driving conditions such as rotational speed since the signals are transmitted by wires between the strap and the slip ring.

"Maximum Stress Measurement on CVT Steel Ring Using Acoustic Emission" by Ozawa and others (Fuji Jyukogyo Kabushiki Kaisya) published as an article at Automobile Technical Society, 1987. discloses a method of measurement utilizing the acoustic emission, which is less restrictive in the driving conditions at the time of measurement.

Disadvantageously, this method is not suitable for the successive measurement of stress under various driving conditions although it is capable of detecting whether the stress has reached a predetermined value or not.

SUMMARY OF THE INVENTION

In view of such problems, it is an object of the present invention to provide a metallic block for detecting a force operating on a metallic V-belt, configured to detect the force operating on the V-belt while driving the belt at a relatively high rotational speed, and to provide a system for the detection of an operating force incorporating the metallic block.

It is another object of the present invention to provide a metallic block for detecting a force operating on a metallic V-belt, capable of detecting the force operating on the V-belt in sequence with all gear ratios during the rotation, and to provide a system for the detection of an operating force incorporating the metallic block.

In order to achieve the above objects, a metallic block according to the present invention which comprises at least one of a multiplicity of metallic blocks constituting a metallic V-belt includes a notch formed in a part thereof, and a strain gauge attached to the notch and intended to detect an external force applied to the metallic block so that a force operating on the metallic V-belt can be detected based on the external force.

In a detection system according to the present invention which comprises a metallic V-belt incorporating a metallic block with strain gauges, a part of the multiplicity of metallic blocks have a telemeter, a battery for driving the telemeter, and a radio transmitting antenna, respectively loaded thereon. The gauges are connected via signal lines to the telemeter, battery and radio transmitting antenna. The detection system further comprises a receiver placed in the vicinity of the metallic V-belt and intended to receive detection values of the strain gauges transmitted in the form of radio signals from the telemeter by way of the transmitting antenna so that an external force to be exerted on the metallic block can be detected based on thus received detection values.

In this case, if necessary, any metallic block may be loaded with a resistor for establishing a Wheatstone bridge in combination with the strain gauges. The resistor for the Wheatstone bridge is also connected via the signal lines to the strain gauges and other components.

By use of thus configured metallic block, the external forces which may cause a strain in the vicinity of the notch can be exclusively taken out for the detection. Thus, irrespective of various kinds of external forces to be applied to the metallic block, an appropriate selection of the shape of notch and the position to form the notch ensures a selective and accurate detection of the respective external forces.

Since detection values of the strain gauges may be transmitted in the form of radio signals to the receiver with the aid of the telemeter and the like provided on the metallic blocks, a successive and accurate detection of an operating force can be realized even under the circumstances where the metallic V-belt rotates at a relatively high speed. This detection system is not subjected to the control of the gear ratios, unlike the conventional system having a pulley modified as a sensor. This results in less restrictive driving conditions at the time of detection and makes it possible to measure the external forces under a variety of driving conditions.

DESCRIPTION OF THE PREFERRED EMBODIMENTS

Figure 1:
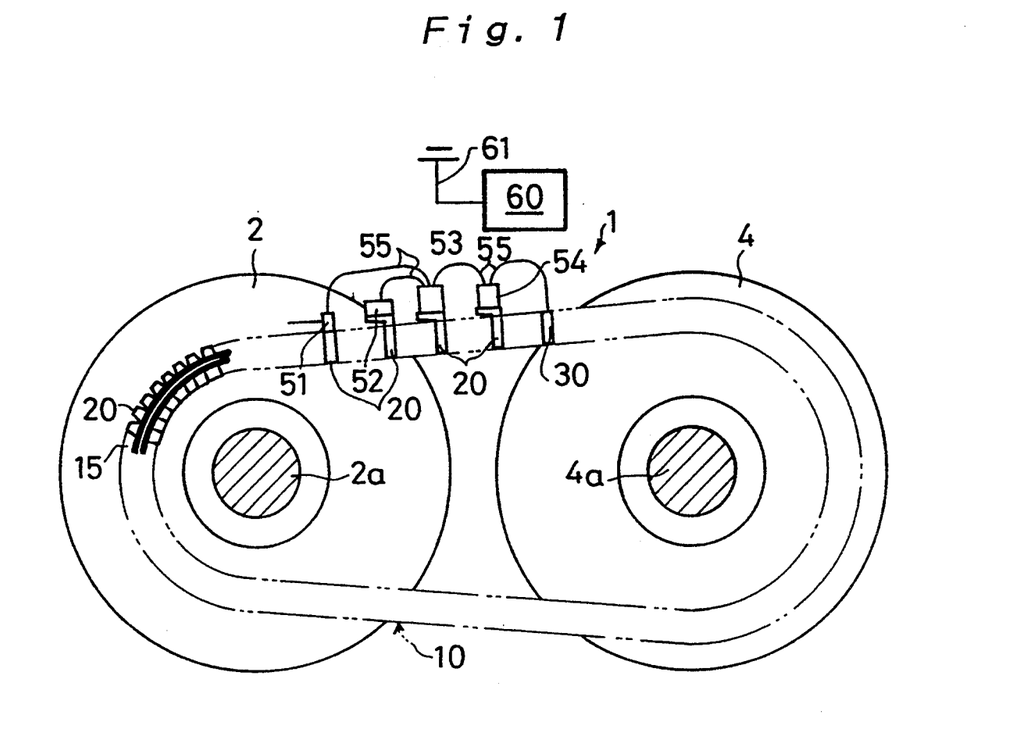
FIG. 1 is a schematic representation of a V-belt type power transmission device having an operating force detector in accordance with the present invention.

FIG. 1 depicts a metallic V-belt type power transmission device generally designated by reference numeral 1 and having an operating force detector constructed in accordance with the present invention. The power transmission device 1 comprises a driving pulley 2 coupled to a driving shaft 2a, a driven pulley 4 coupled to a driven shaft 4a, and a metallic V-belt 10 passing between both the pulleys 2 and 4. The pulleys 2 and 4 have their respective pulley grooves whose widths are controllably variable. The control of the pulley groove widths enables winding radii of the metallic V-belt 10 with respect to the pulleys 2 and 4 to vary, to thereby steplessly change a reduction ratio (or speed ratio) from the driving shaft 2a to the driven shaft 4a.

Figure 2:
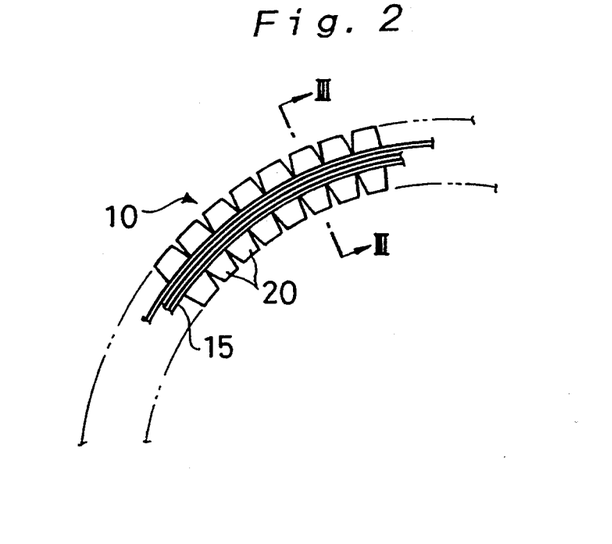
FIG. 2 is a partially enlarged schematic view of the power transmission device.
Figure 3:
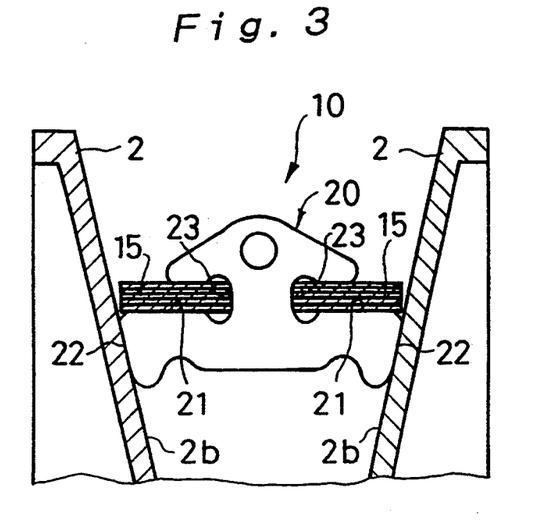
FIG. 3 is a schematic sectional view of the power transmission device taken along the arrow III—III in FIG. 2.

FIGS. 2 and 3 are an enlarged view of the metallic V-belt 10 and a sectional view of the same taken along an arrow III—III in FIG. 2, respectively. As is apparent from these figures, the metallic V-belt 10 comprises a pair of right and left endless loop-like metallic belt straps 15 and a multiplicity of metallic blocks 20 attached to and along the straps 15. To this end, each of the metallic blocks 20 has a pair of traversely open strap grooves 23 into which the pair of belt straps 15 are sequentially fitted side by side. The belt straps 15 are each made of a plurality of (for example, approximately ten) layered thin metallic belt straps.

As best seen in FIG. 3, the metallic blocks 20 each have tapered sidewalls 22 adapted to abut against groove surfaces 2b and 4b of the V-pulleys 2 and 4, respectively. By virtue of this construction, a variation in the groove widths of the V-pulleys 2 and 4 results in a vertical displacement of the metallic V-belts in the figure, which in turn leads to a variation in the winding radii thereof.

Figure 4:
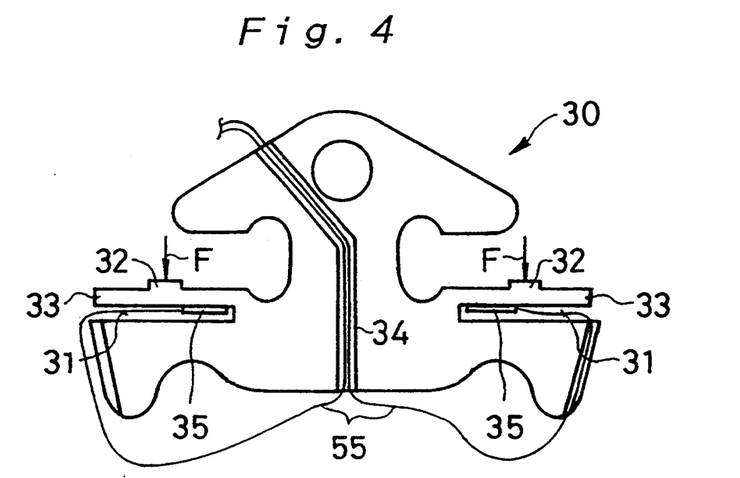
FIG. 4 is a front elevational view of a metallic block used for the detection of an operating force in the device.

In the power transmission device 1, a tension of the metallic belt 10 which is exerted on the belt straps 15 can be measured during the operation. To this end, several (metallic blocks 30) of the multiplicity of metallic blocks 20 constituting the metallic V-belt 10 are configured as shown in FIG. 4 and sequentially arranged, the intermediate one of the metallic blocks 30 being provided with strain gauges as detailed below. The metallic blocks 30 are each comprised of a machined metallic block 20 having notches 31 extending substantially parallel to saddle surface 21 (refer to FIG. 3) adapted to receive the belt straps 15 so as to define cantilevered portions 33 underneath the saddle surface 21, the tips of the cantilevered portions 33 being slightly cut to prevent contacts with the V-groove sidewalls of the pulleys, and the saddle surface 21 being cut to form a protrusion 32.

As shown, the inner surfaces of the cantilevered portions 33 facing the notches 31 each have the strain gauge attached hereto. The application of a pressing force F by the belt straps 15 onto the protrusions 32 causes the cantilevered portions 33 to be strained, the amount of which strain is detected by means of the strain gauges 35 to detect the pressing force F. It will be understood that several metallic blocks sandwiching the metallic block 30 with the strain gauges 35 are also to be subjected to the same machining since irrespective of such machining for the single metallic block 30 the strain of the cantilevered portion 33 may be blocked by the stringlike tension of the straps 15 caused by the metallic blocks resting in front of and behind the metallic block 30 with the strain gauges 35.

The strain gauges 35 are linked with signal lines 55 arranged within a relatively shallow communication groove 34 provided in the metallic block 30 so as to fetch values detected by the strain gauges 35 through the signals lines 55.

Turning now to FIG. 1, a series of metallic blocks 20 constituting the metallic V-belt 10 have thereon a radio transmitting antenna 51, a battery 52, a telemeter 53 and a Wheatstone bridge resistor 54 in place, respectively, each being connected to the signal lines 55. Detection signals derived from the strain gauges 35 attached to the metallic block 30 are transmitted through the signal lines 55 to the Wheatstone bridge resistor 54 in order to fetch a signal corresponding to the pressing force F from a bridge circuit comprised of the strain gauges 35 and the Wheatstone bridge resistor 54. Thus obtained signal is further transmitted through the signal lines 55 to the telemeter 53, and is sent out by way of the radio transmitting antenna 51 in the form of a radio signal. The drive power required at that time can be derived from the battery 52.

In the vicinity of the power transmission device 1 there is disposed a receiver 60 having a receiving antenna 61 through which the radio signal sent out from the transmitting antenna 51 is introduced into the receiver 60. Thus, the detection value of the strain gauge 35 can be detected within the receiver 60 to find the pressing force F. Such arrangement ensures the use of the metallic belt 10 under substantially the same conditions as those in the ordinary use, and enables a successive measurement on real-time basis to be performed under different driving conditions.

Figure 5:
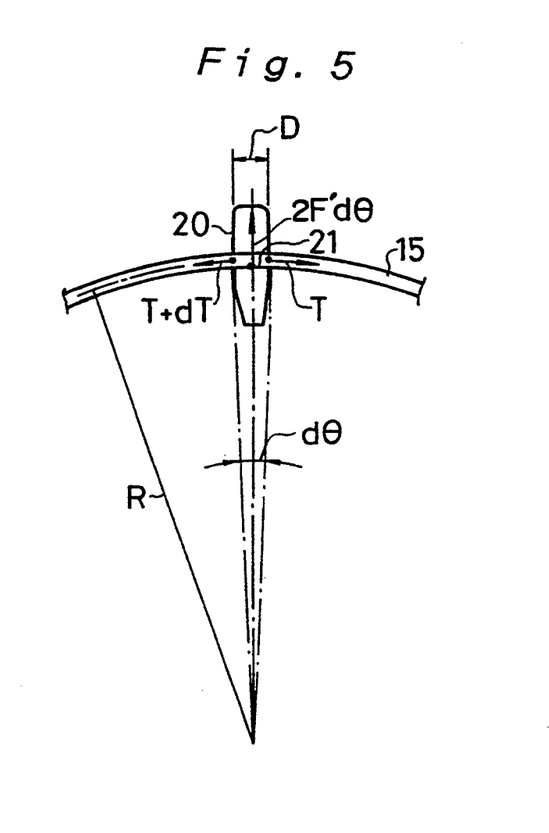
FIG. 5 is an explanatory diagram showing the relationship between a pressing force F applied to a saddle surface of the metallic block and a tension T of belt straps.

It is to be appreciated that tension T of the belt straps 15 can be determined based on herein detected pressing force F applied by the belt straps 15 onto the protrusions 32 of the metallic block 30, in other words, the pressing force F of the belt straps 15 to be exerted on the saddle surface 21 of the metallic block 20, which will be described below with reference to FIG. 5.

Let $F'$ be a unit pressing force per unit angle (radian) on the saddle surface 21 of the metallic block 20, and let $d\theta$ be an infinitesimal angle confined by the belt straps 15, and let T and T+dt be tensions exerted on respective sides of the belt straps 15 in the region of the infinitesimal angle, then the following relationship can be established based on the balance in the radial direction.

$(T+dT)\cdot\sin(d/2)+T\cdot\sin(d/2)=2F'\cdot d\theta$

Since d represents an infinitesimal value,
sin (d/2)=d/2 and
$dT\cdot d\theta=0$,
which give
$T=2F'$ Here, let D be a thickness of the metallic block 20, and let R be a pitch radius of the belt strap 15, then R/D represents the number of metallic blocks per unit angle. With respect to the pressing force F acting on the saddle surface 21 of the metallic block 20, we get $F'=F\cdot R/D$ Hence, $T=2F\cdot R/D$ As seen from this equation, the pressing force F of the belt strap 15 to be applied to the saddle surface 21 is proportional to the tension T of the belt strap 15, and therefore the tension T can be obtained by finding the pressing force F.

Although the above description has been made on the case where the pressing force F exerted on the saddle surface and therefore the tension T of the belt strap 15 are determined by means of the device in accordance with the present invention, it is also possible to detect the other various operating forces by the use of a block configured as described below in lieu of the metallic block 30.

Figure 6:
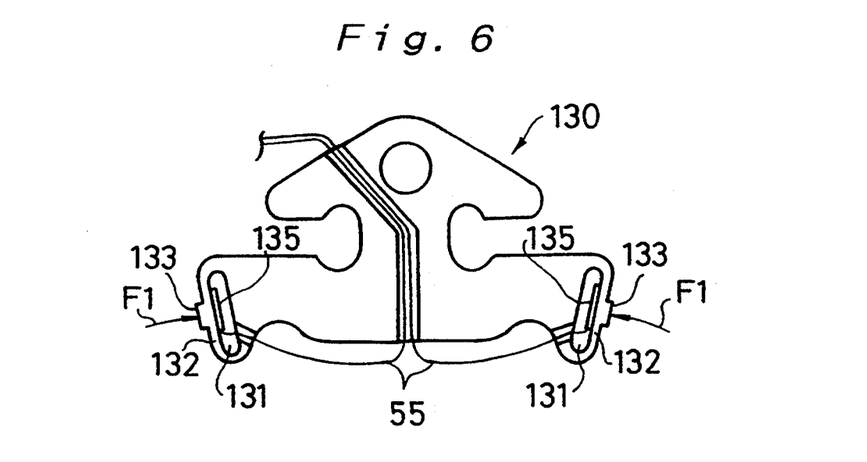
FIG. 6 is a front elevational view of another embodiment of the metallic block used for the detection of an operating force in the device.

For example, a metallic block 130 as shown in FIG. 6 may be used to measure a pressing force F1 acting on tapered surfaces on both sides of the metallic block 130. The metallic block 130 includes a pair of elongated hole-like notches 131 extending along the lateral tapered surfaces, respectively, and includes a pair of bridge portions 132 having protrusions 133 provided on the lateral tapered surfaces, respectively.

Such configuration permits the bridge portions 132 to be deformed in compliance with the pressing force F1 to be applied thereto. To the surfaces defining the notches 131 of the bridge portions 132 there are attached a pair of strain gauges 135 by means of which a pressing force F1 can be measured based on the deformation of the bridge portions caused when subjected to the pressing force F1.

Figure 7A:
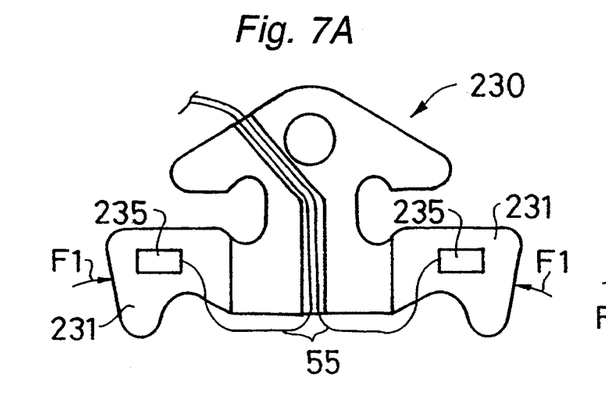
FIGS. 7A and 7B are front and side elevational views, respectively, showing still another embodiment of the metallic block used for the detection of an operating force in the device.
Figure 7B:
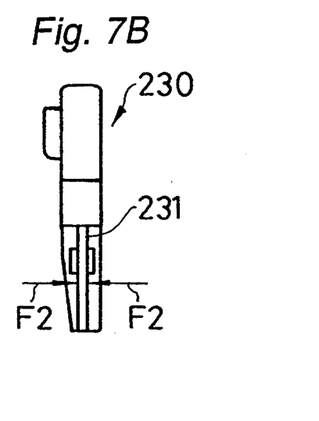

Turning next to FIG. 7, there is depicted a metallic block 230 machined for the measurement of a forward or backward operating force F2 in the rotational direction to be exerted on the right and left tapered surfaces of the metallic block. The metallic block 230 has right and left thin portions 231 formed by taperingly cutting the front and back surfaces toward its lateral edges and each having thereon front and back strain gauges 235. The thin portions 231 are strained in the forward and backward direction under the influence of the operating force F2, and hence the strain gauges 235 can be used to measure the operating force F2.

Preferably, a four-gauge type strain gauge is used as the strain gauge 235 for the purpose of detecting only the operating force F2 excluding the pressing force F1 since the thin portions 231 may also be subjected to the pressing force F1 acting on the right and left tapered surfaces as well as the pressing force F2.

Figure 8:
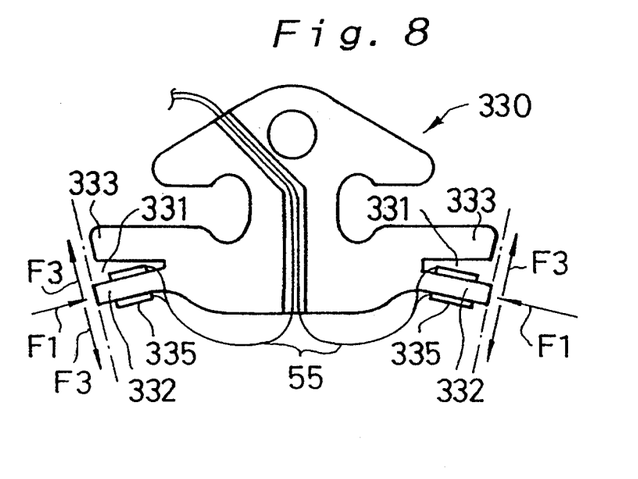
FIG. 8 is a front elevational view of a further embodiment of the metallic block used for the detection of an operating force in the device.

With the aid of a metallic block 330 machined as shown in FIG. 8, there can be found an operating force F3 which is to be applied to operative tapered surfaces of the metallic block inwardly and outwardly in the radial direction. The metallic block 330 includes a pair of notches 331 extending inwardly from the middle of the right and left tapered surfaces, respectively, and defining thereunder (radially inwardly) a pair of cantilevered portions 332, respectively. A strain gauge 335 is attached to the top and bottom surfaces of each of the cantilevered portions 332. It is to be noted that the edge of a portion 333 overlying the notch 331 is slightly cut so as not to come into contact with the inner surface of the pulley.

In the case of this metallic block 330, the tip of the cantilevered portion 332 is exclusively allowed to be in contact with the inner surface of the pulley. This results in a deformation of the cantilevered portion 332 of the metallic block 330 under the influence of the operating force F3 when, for example, the metallic block is displaced inwardly or outwardly in the radial direction due to a change in the wounding radii of the metallic V-belt 10 at the time of gear change, for example. The operating force F3 can thus be detected by the strain gauge 335.

It is also desirable in this case that the four-gauge type strain gauge be used as the strain gauge 335 so as to detect only the operating force F3 with the exclusion of the pressing force F1 and the like since the cantilevered portion 332 is also inevitably subjected to the pressing force F1 and the like to be applied to the right and left tapered surfaces.

Figure 9A:
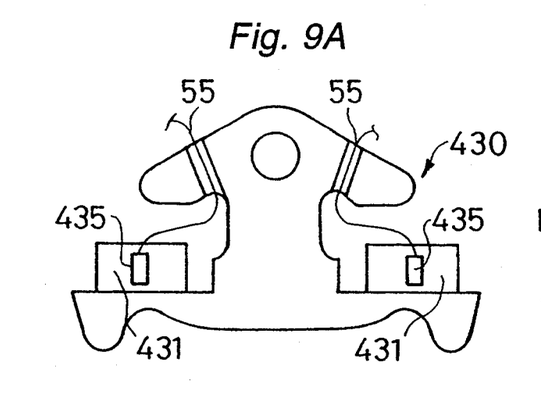
FIGS. 9A and 9B are front and side elevational views, respectively, showing a still further embodiment of the metallic block used for the detection of an operating force in the device.
Figure 9B:
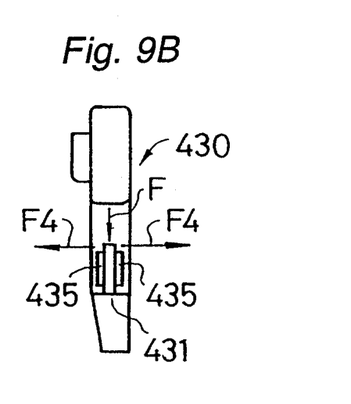

A metallic block 430 configured as shown in FIG. 9 can be used to detect a forward or backward operating force F4 in the rotational direction to be conferred onto the saddle surface of the metallic block by the belt straps 15. The metallic block 430 includes a pair of right and left thin portions 431 formed by cutting the front and rear surfaces resting beneath the saddle surface, each having front and rear strain gauges 435 attached thereon. The thin portion 431 undergoes the operating force F4 to be strained backward and forward so that the operating force F4 can be measured by means of the strain gauges 435.

It is preferable in this case that the strain gauge of four-gauge type be used as the strain gauge 435 for the purpose of detecting only the operating force F4 excluding the pressing force F since the thin portions 431 are also subjected to the pressing force F to be exerted on the saddle surface from above.

Figure 10:
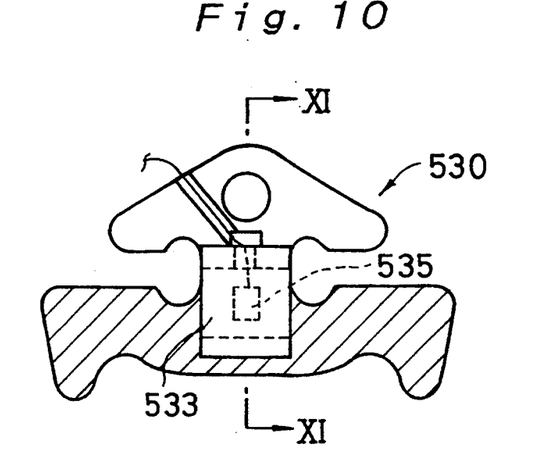
FIG. 10 is a front elevational view of a yet still further embodiment of the metallic block used for the detection of an operating force in the device.
Figure 11:
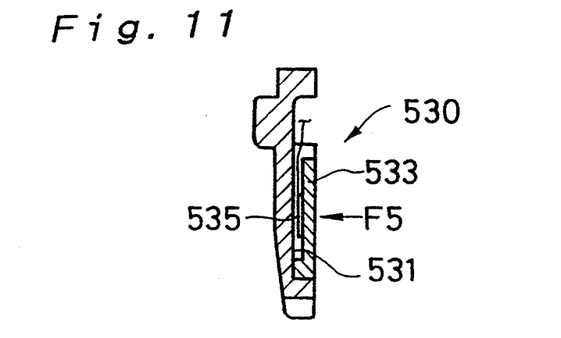
FIG. 11 is a sectional view of the metallic block taken along the arrow XI—XI in FIG. 10.
Figure 12:
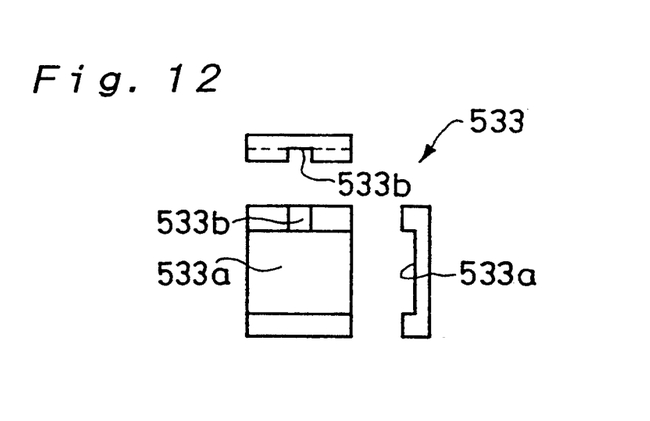
FIG. 12 illustrates three aspects of a pressure receiving member for use in the metallic block shown in FIG. 10.

Referring finally to FIG. 10, there is illustrated a metallic block 530 configured to be capable of measuring a pressing force F5 (that is, a pressing force interacting between the adjacent metallic blocks) to be exerted on the front and rear surfaces of the metallic block. The metallic block 530 includes at its front side a substantially rectangularly machined recess (or a notch) 531 whose periphery (hatched in FIG. 10) is slightly cut in, and includes a pressure receiving member 53 configured as shown in FIG. 12 and disposed within the recess 531. This construction prevents the slightly cut-in periphery from being brought into contact with the adjacent metallic block and allows only the pressure receiving member 533 to be abutted against the adjacent metallic block.

The pressure receiving member 533 includes a recess 533a and a groove 533b. After the attachment of the strain gauge 535 into the recess 533a, the pressure receiving member 533 is secured to the rectangular recess 531 as shown with the recess 533a facing inwardly. The groove 533b receives a signal line 55 connected to the strain gauge 535.

In the case of this metallic block 530, the pressing force F5 from the adjacent metallic blocks in front and behind is allowed to exclusively act on the pressure receiving member 533 so that the pressing force F5 can be detected by means of the strain gauge 535.

According to the present invention as described hereinabove, a part of at least one of a multiplicity of metallic blocks constituting a metallic V-belt is notched, to which strain gauges are attached to thereby detect an external force applied to the metallic block and an operating force based on the external force. Thus, by appropriately selecting the configuration of the notch and the position to form the notch, selective and accurate detection of various operating forces can be realized.

Furthermore, in the metallic V-belt incorporating the metallic block(s) having the strain gauges attached thereto according to the present invention, there are mounted a telemeter, a battery for driving the telemeter and a radio transmitting antenna on any metallic blocks, respectively. The strain gauges are connected via signal lines to the telemeter, the battery and the transmitting antenna. A receiver disposed in the vicinity of the metallic V-belt receives detection values of the strain gauges transmitted in the form of radio signals from the telemeter by way of the transmitting antenna, so that the forces operating on the metallic V-belt can be detected based on the received detection values, thus ensuring successive and accurate measurement of the operating forces with all gear ratios even under the circumstances where the metallic V-belt rotates at a relatively high speed. This results in less restrictive driving conditions at the time of measurement, and makes it possible to measure the operating forces under various driving conditions.

Depending on the strain gauges to be used, a resistor for the formation of Wheatstone bridge may be mounted on any metallic block.

What is claimed is:

1. A metallic block for the detection of a force operating on a metallic V-belt including endless belt-like supporting straps and a multiplicity of metallic blocks supported along said straps and passing around a driving pulley and a driven pulley, at least one of said multiplicity of metallic blocks comprising:
   a notch formed in a part thereof; and
   a strain gauge attached to said notch and intended to detect an external force applied to said metallic block,
   said force operating on said metallic V-belt being detected based on said external force.

2. A metallic block according to claim 1, wherein said multiplicity of metallic blocks constituting said metallic V-belt each include a pair of right and left strap grooves opening rightward and leftward, respectively, said metallic blocks being mounted on said supporting straps in series in such a manner that said supporting straps are fitted into said strap grooves.

3. A metallic block according to claim 1, wherein said at least one of metallic blocks includes a pair of notched grooves to define a pair of cantilevered portions beneath a saddle surface receiving said supporting straps, said strain gauge being attached to the inner surfaces of said notched grooves defining said cantilevered portions, said saddle surface being cut to define protrusions to be abutted against said supporting straps, side ends of said cantilevered portions being cut so as to prevent a contact with said driving pulley and said driven pulley.

4. A metallic block according to claim 1, wherein said at least one of metallic blocks has lateral portions to be abutted against the inner surfaces of said driving pulley and said driven pulley, said lateral portions comprising lateral tapered surfaces along which elongated hole-like notches are provided, said metallic block further comprising a pair of bridge portions formed between said notches and said lateral tapered surfaces, said strain gauge being attached to the inner surfaces of said bridge portions facing said notches, said lateral tapered surfaces being cut so as to define a pair of protrusions to be abutted against the inner surfaces of said driving pulley and said driven pulley.

5. A metallic block according to claim 1, wherein said at least one of metallic blocks has at its right and left sides thin portions formed by cutting circumferentially front and rear surfaces thereof, said strain gauge being attached to said front and rear surfaces of said thin portions.

6. A metallic block according to claim 1, wherein said at least one of metallic blocks has lateral portions to be abutted against the inner surfaces of said driving pulley and said driven pulley, said lateral portions comprising lateral tapered surfaces, said metallic block further comprising a pair of notches extending inwardly from the middle of said lateral tapered surfaces and defining a pair of cantilevers radially inside thereof, said strain gauge being attached to the radially inside and outside surfaces of said cantilevers, edges of the remainder of said lateral portions being cut short of said inner surfaces of said driving pulley and said driven pulley so as to prevent a contact with the inner surfaces thereof while allowing only the edges of said cantilevers to be in contact with the inner surfaces thereof.

7. A metallic block according to claim 1, wherein said at least one of metallic blocks has at its right and left sides thin portions formed by cutting circumferentially front and rear surfaces beneath said saddle surface receiving said supporting straps, said strain gauge being attached to said front and rear surfaces of said thin portions.

8. A metallic block according to claim 1, wherein said at least one of metallic blocks has at its front surface a substantially rectangular recess formed in the middle thereof, whose periphery is slightly cut in, said metallic block further comprising a pressure receiving member disposed within said recess and defining a space with respect to the bottom of said recess, said strain gauge being attached to the inner surface of said pressure receiving member confronting said bottom.

9. A detection system for detecting a force operating on a metallic V-belt including endless belt-like supporting straps and a multiplicity of metallic blocks supported along said straps and passing around a driving pulley and a driven pulley, at least one of said multiplicity of metallic blocks comprising:
a notch formed in a part thereof; and
a strain gauge attached to said notch;
a part of said multiplicity of metallic blocks except said at least one of metallic blocks having a telemeter, a battery for driving said telemeter, and a radio transmitting antenna, respectively, loaded thereon, said gauge being connected via signal lines to said telemeter, battery and radio transmitting antenna,
said system further comprising a receiver placed in the vicinity of said metallic V-belt and intended to receive detection values of said strain gauges transmitted in the form of radio signals from said telemeter by way of said transmitting antenna so that an external force to be exerted on said metallic block can be detected based on thus received detection values.

* * * * *